United States Patent [19]
Burdick et al.

[11] 4,126,093
[45] Nov. 21, 1978

[54] AIR SUPPLY TRACK FOR AIR BEARING TRANSPORTER AND THE LIKE

[75] Inventors: Robert E. Burdick, Santa Barbara; Punamchand P. Prajapati, Goleta, both of Calif.

[73] Assignee: Rolair Systems, Inc., Santa Barbara, Calif.

[21] Appl. No.: 716,295

[22] Filed: Aug. 20, 1976

Related U.S. Application Data

[63] Continuation-in-part of Ser. No. 598,413, Jul. 23, 1975, abandoned.

[51] Int. Cl.² ............ B60V 3/04; B61B 13/12
[52] U.S. Cl. ............ 104/159; 104/23 FS; 104/155; 104/157; 104/161
[58] Field of Search ............ 104/23 FS, 134, 139, 104/146, 154, 155, 156, 157, 158, 159, 161; 105/63; 180/124, 125; 214/1 BE

[56] References Cited

U.S. PATENT DOCUMENTS

| 614,095 | 11/1898 | Farrar | 104/159 |
| 680,849 | 8/1901 | Farrar | 104/159 |
| 3,580,401 | 12/1968 | Stahl | 104/23 FS X |
| 3,754,617 | 8/1973 | Duthion et al. | 180/124 X |
| 3,791,477 | 2/1974 | Burdick | 180/125 X |
| 3,831,708 | 8/1974 | Terry | 180/125 X |

*Primary Examiner*—Randolph A. Reese
*Attorney, Agent, or Firm*—Harris, Kern, Wallen & Tinsley

[57] ABSTRACT

An air supply track for positioning in a floor, and a probe for mounting on a vehicle which moves along the floor. An air supply track having a slotted conduit with the slot closed by a membrane urged against the slot by air pressure within the conduit. A probe movable into engagement with the membrane for moving the membrane away from the slot permitting air flow through apertures in the membrane into the probe and then into the vehicle.

16 Claims, 10 Drawing Figures

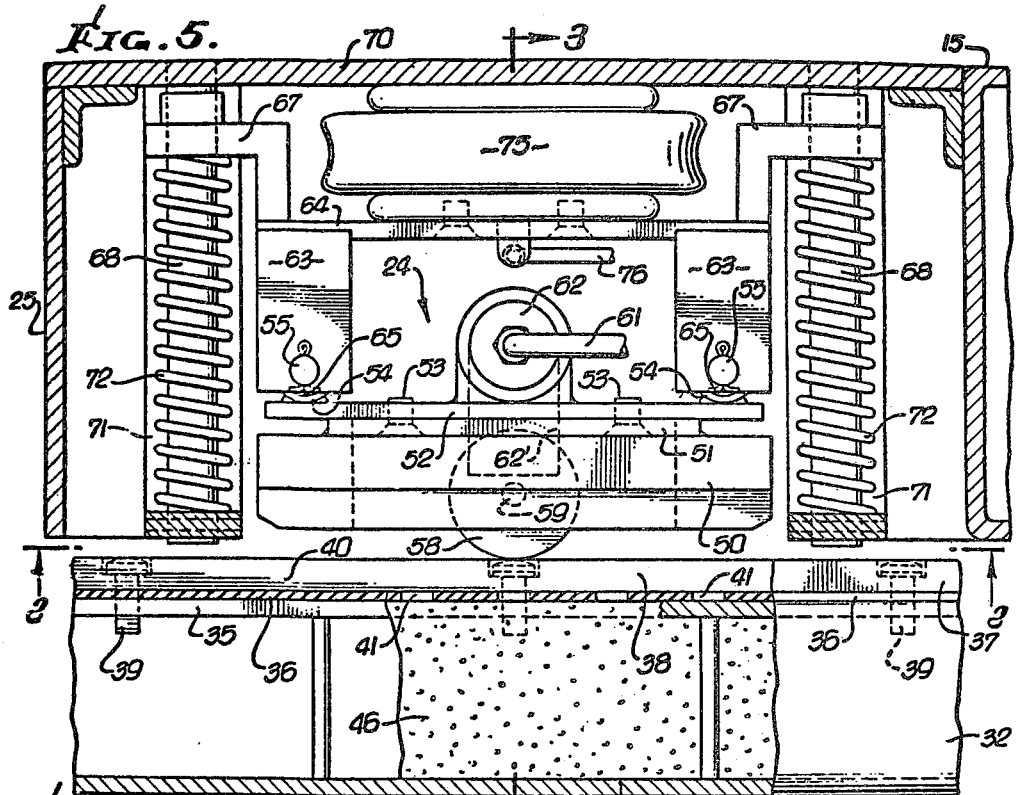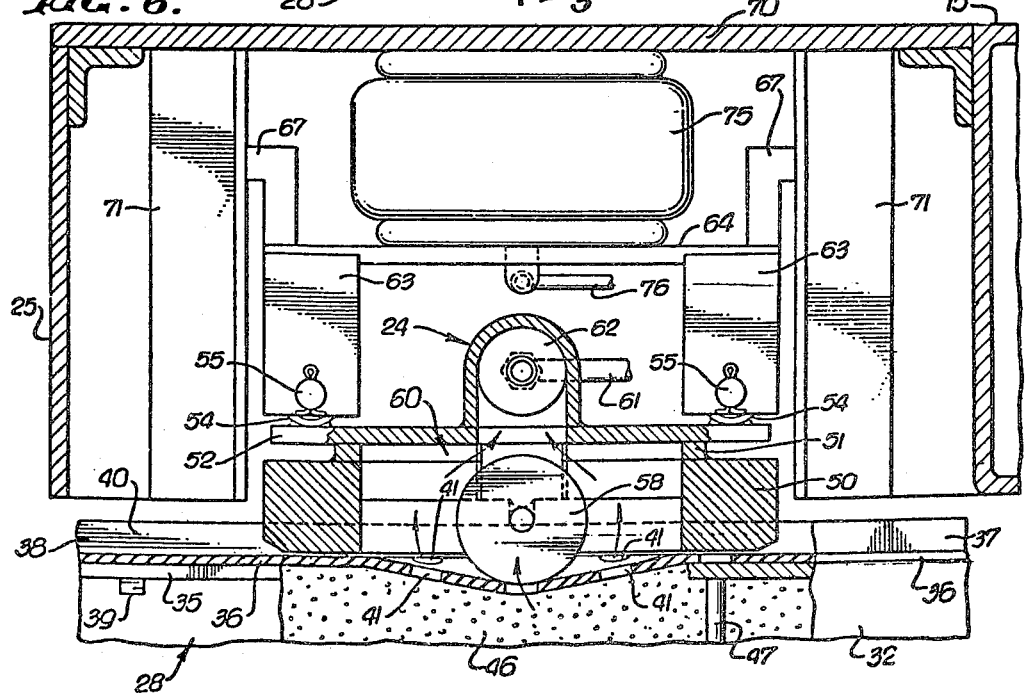

AIR SUPPLY TRACK FOR AIR BEARING TRANSPORTER AND THE LIKE

CROSS REFERENCE TO RELATED APPLICATION

This application is a continuation-in-part of our co-pending application bearing the same title, Ser. No. 598,413, filed July 23, 1975, now abandoned.

BACKGROUND OF THE INVENTION

This invention relates to air supply systems and in particular, to a new and improved air supply system incorporating a track along which a vehicle may move and pick up air from the track. The invention will be described herein as used with an air bearing transporter such as is shown by way of example in U.S. Pat. No. 3,796,279. However the air supply system of the present invention is not limited to use with air bearing transporters and may be utilized for supplying air under pressure to any type of vehicle or other load while moving or stationary.

An air bearing transporter has a plurality of air bearings which produce an air film between the transporter and the floor or other surface resulting in very low friction permitting the transporter and its load to be moved with a small force. The transporter requires a supply of air under pressure which may be provided by an onboard compressor or by a hose connection or by an air supply in the floor over which the transporter moves.

A prior air supply system with an air track is shown in U.S. Pat. No. 3,820,467. The air track comprises one or more ducts in the floor with openings along the upper surface of the duct for air flow into the vehicle positioned above the ducts. In this prior art system, the air passages in the upper wall of the ducts are open at all times, resulting in continuous air flow through all openings even though the vehicle is positioned over only a few of the openings. Such a system requires a relatively high rating for the compressed air source while wasting most of the compressed air.

In order to meet this disadvantage, various types of air supply systems have been developed utilizing control valves for the air flow. However the large number of valves required makes these systems expensive, and the valves are subject to damage and jamming and require continuous maintenance.

Another form of air track is shown in U.S. Pat. No. 3,722,424. In one embodiment, the spaced openings along the duct are closed by a sealing strip which is moved downward exposing the openings in the duct by the vehicle as it moves along the track. An alternative embodiment utilizes a pair of resilient tubes for closing a continuous opening in the duct, with a support structure carried by the vehicle and moving between the resilient tubes on rollers providing air flow from the duct to the vehicle. Another prior art system is shown in U.S. Pat. No. 3,190,460, utilizing a resilient duct with lips moved inward to an open position by a suction applied to the duct.

It is an object of the present invention to provide a new and improved air supply system which is simple to manufacture, install and maintain, relatively inexpensive and trouble free, and having substantially no air losses. A further object is to provide a new and improved air supply system utilizing an air track for the floor and a cooperating probe for the vehicle, with the probe being engageable with and disengageable from the air track as desired permitting control of movement of the vehicle along the track and permitting movement of the vehicle away from the track as desired. An additional object is to provide an air track and movable probe combination which can operate with the track in an overhead or side wall position. Other objects, advantages, features and results will more fully appear in the course of the following description.

SUMMARY OF THE INVENTION

The air supply system of the present invention includes a track comprising an air conduit with a slot therealong and a membrane carried in the conduit at the slot with air pressure in the conduit urging the membrane against the slot in sealing relation. The membrane has openings therealong which openings are closed by the conduit when the membrane is against the slot. The air supply system includes a probe suitable for mounting on the vehicle to be supplied with air. The probe includes a shoe for engagement with the conduit at the slot and a membrane contact member carried in the shoe, the contact member typically being a roller. The probe includes means for moving the shoe toward the track engaging the contact member with the membrane moving the membrane away from the slot and permitting air flow from the conduit through the membrane openings and the slot into the shoe, with an air line from the shoe to the vehicle. This moving means typically is an air cylinder. When the shoe is withdrawn from engagement, the air pressure within the conduit seals the membrane against the conduit slot and prevents air leakage. Hence there is air flow from the air track only at the point of engagement with the probe. In an alternative embodiment, the probe is separate from the vehicle or other load, and the air track and probe may be positioned in the floor, overhead or on the side, as desired.

BRIEF DESCRIPTION OF THE DRAWINGS

FIG. 5 is an enlarged partial sectional view taken along the line 5—5 of FIG. 1 showing the probe in the raised position;

FIG. 6 is a view similar to that of FIG. 5 showing the probe in the lowered position;

DESCRIPTION OF THE PREFERRED EMBODIMENTS

Figure 1:
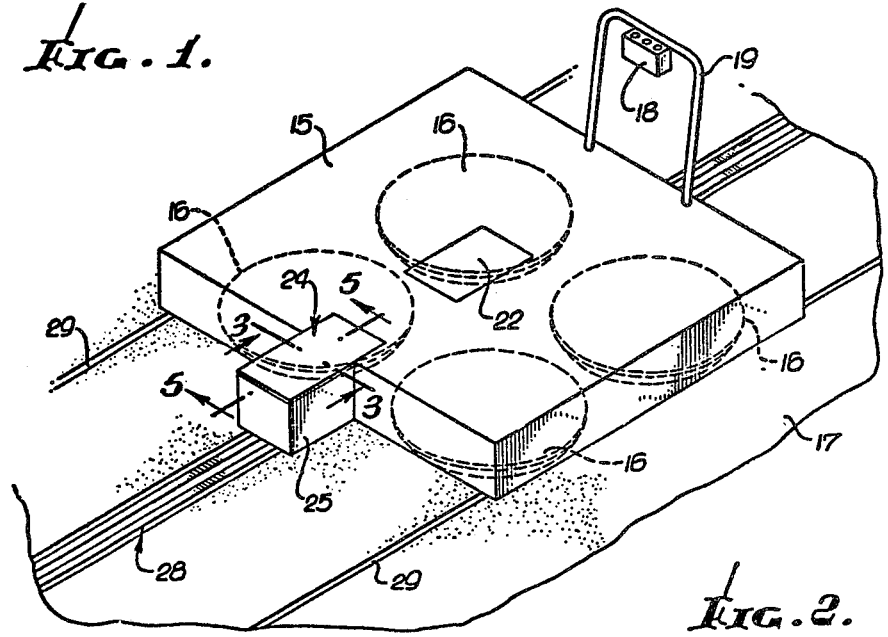
FIG. 1 is a perspective view illustrating an air transporter moving along a floor and incorporating the presently preferred embodiment of the invention.

In FIG. 1, an air bearing transporter 15 with four air bearings 16 rests on a floor 17. The transporter may be conventional in design, such as is shown in the aforementioned U.S. Pat. No. 3,796,279. A control box 18 carrying control valves for the air circuit may be mounted on a rail 19 at one end of the transporter. The transporter itself is suitable for carrying any type of load. An air powered drive unit 22 of conventional design may be mounted in the transporter. A typical drive unit includes an air motor for rotating a set of drive wheels, and an air cylinder for urging the drive wheels downward into engagement with the floor.

An air probe 24 is mounted in a housing 25 attached to the transporter. The air probe will be described in greater detail hereinbelow.

An air track 28 is positioned in the floor 17 for engagement by the probe 24. Guide tracks 29 may also be provided in the floor for engagement by guide wheels (not shown) of the transporter. Typically the guide wheels will be made retractible so that the transporter can be moved in any direction when the wheels are retracted, with the transporter being guided along the air track when the wheels are extended into engagement with the guide tracks 29.

Figure 3:
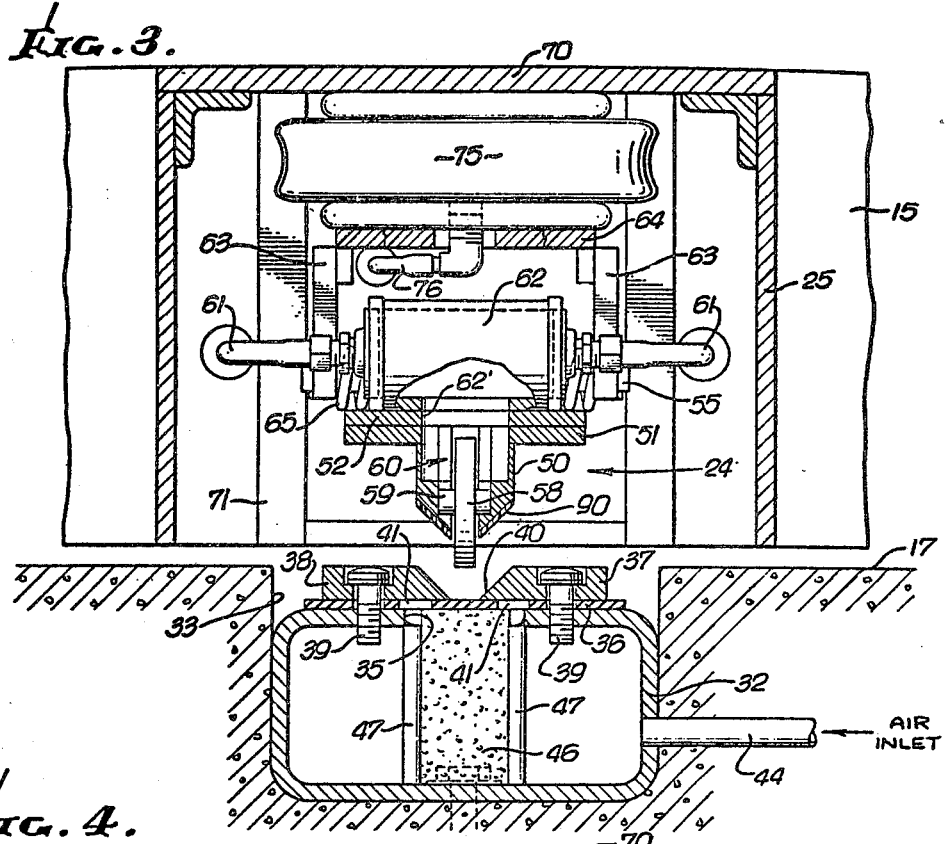
FIG. 3 is an enlarged partial sectional view taken along the line 3—3 of FIG. 1 with the probe in the raised position.

The presently preferred embodiment of the air track 28 is best seen in FIGS. 3 and 5. A conduit, typically a box beam 32, is positioned in a groove 33 in the floor 17, preferably so that the upper surface of the air track is flush with the surface of the floor. An opening 35 is provided in the top surface of the box beam 32, with a membrane 36 clamped on top of the box beam by clamping members 37, 38 which are fixed to the beam by screws 39. The clamping members 37, 38 are spaced apart defining a slot 40 therebetween. A plurality of openings 41 are provided in the membrane 36 on either side of the slot 40. The membrane 36 is flexible and typically may be made of standard conveyor belting or similar material. Because of problems of separation of the conventional belting coating from the fabric, it is preferred to use a heavy fabric with a thick urethane coating.

Air is supplied under pressure to the conduit through an air inlet 44 with the air pressure typically in the range of 75 to 100 pounds per square inch. With the air supply on and the probe in the position of FIG. 3, the membrane 36 is held upward against the clamp members 37, 38 sealing the slot 40. A typical installation may have several hundred feet of air track and it has been found that in some instances when the air supply is initially turned on there will be some air leakage through the openings 41 and out the slot 40 preventing engagement of the membrane with the clamp members. While this is not a problem in all installations, it can be solved by placing a resilient support member, such as a block 46 of a resilient material such as flexible foam, within the box beam under the membrane. The block may be held in place by posts 47. The block 46 preferably is air permeable so that it has little effect on air flow. The block will hold the membrane against the clamp members when the air supply is off so that when the air supply is turned on, the air pressure will immediately seal the membrane against the clamp members.

Figure 2:
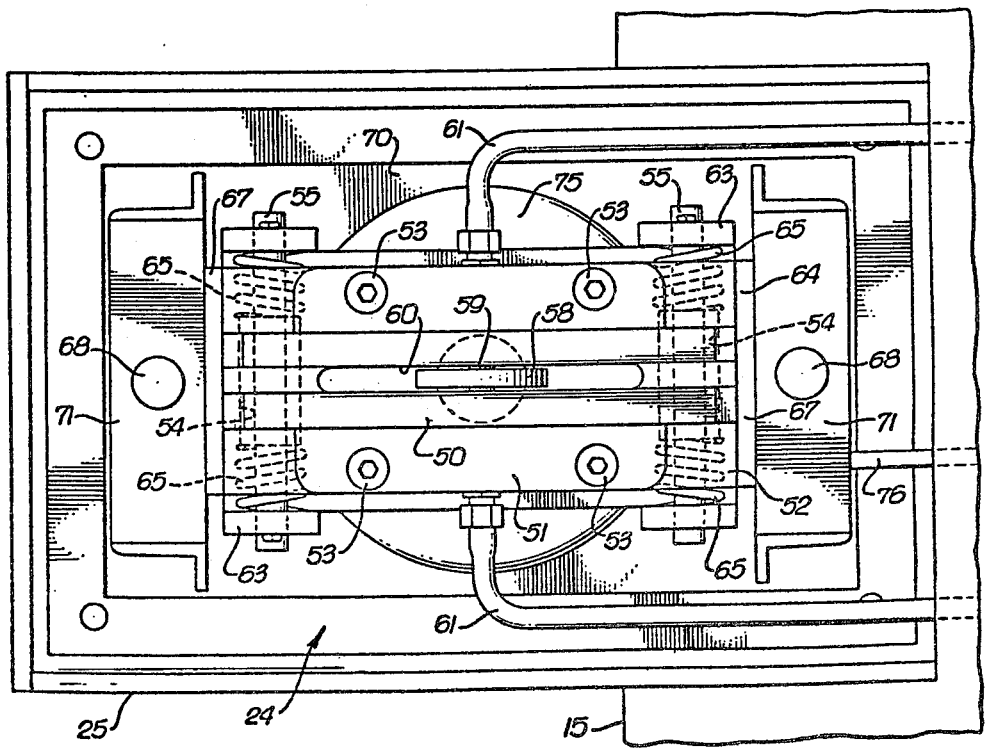
FIG. 2 is an enlarged bottom view of the probe of the transporter of FIG. 1.

The probe 24 is best seen in FIGS. 2, 3 and 5. A shoe 50 is welded to a first plate 51 which in turn is fastened to a second plate 52 by screws 53. Sleeves 54 are welded to the plate 52 and slide on pins 55.

A wheel 58 rotates on a shaft 59 in a slot 60 of the shoe 50. A tube 62 is mounted on the upper plate 52 and is connected to the transporter by flexible lines 61.

Opening 62' provides an air flow passage from the slot 60 of the shoe to the interior of the tube 62.

The pins 55 are carried on vertical arms 63 of a vertical sliding bracket 64. Springs 65 are positioned about the pins 55 on each side of the sleeves 54 for urging the shoe to a centered position. The bracket 64 has arms 67 which slide on pins 68. The pins are carried in a top plate 70 by U-shaped brackets 71, with springs 72 between the arms 67 and the bottoms of the brackets 71 urging the slide bracket 64 upward.

An air cylinder 75 is mounted between the top plate 70 and the sliding bracket 64, and is connected to an air source via a line 76. When the line 76 is connected to the atmosphere, the springs 72 urge the shoe upward to the position of FIGS. 3 and 5. When a source of air under pressure is connected to the line 76, the air cylinder 75 is expanded, moving the shoe downward as shown in FIGS. 4 and 6 and compressing the springs 72.

Figure 8:
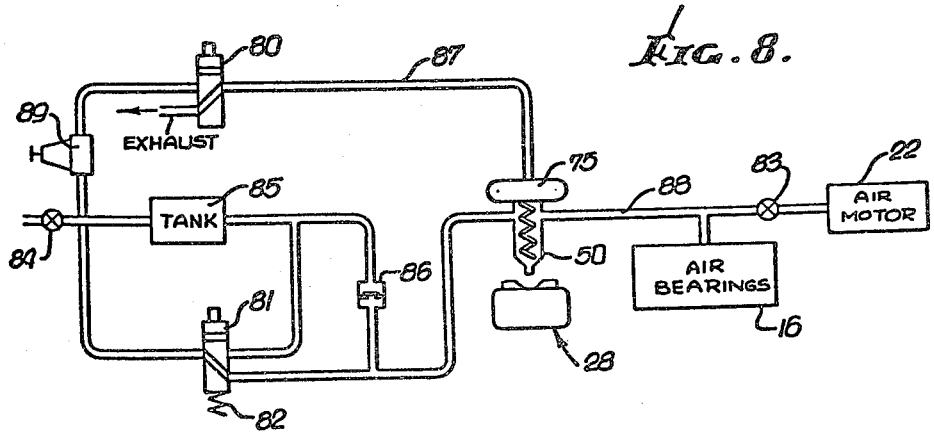
FIG. 8 is a diagram of an air control circuit suitable for use with the transporter of FIG. 1.

A suitable air control circuit for the transporter is shown in FIG. 8. A first on-off valve 80 is shown in the off position. A second on-off valve 81 is also shown in the off position, and preferably has a spring 82 for returning it to the off position when manually released. A pressure regulator 89 may be connected in the line between the valve 81 and the valve 80. A third valve 83 may be provided for controlling the air motor of the drive unit 22, and preferably is a throttling type valve for speed control. A supply of air is required at initial startup for actuating the air cylinder 75 to move the probe into engagement with the air track. This may be provided from an external line connected at a valve 84 or from an onboard storage tank 85. A check valve 86 is positioned in the line between the probe and the storage tank 85 for one way flow from the probe to the tank for charging the tank.

All the components are shown in the off or rest position in FIG. 8. When it is desired to move the vehicle along the track, the valve 80 is moved to the on position, connecting the valve 81 to the air cylinder 75. The valve 81 is then moved to the on position, supplying air from the tank 85 to the air cylinder 75 and moving the probe downward into engagement with the air track. This engagement provides air from the track to the lines 87, 88 in a manner to be described. The valve 81 may be released and air in line 87 maintains the air cylinder 75 in the expanded condition and also recharges the tank 85 through the check valve 86. Air in line 88 provides air for the air bearing 16 with the transporter now floating on the air film and ready for movement. The transporter may be moved manually or may be moved by opening valve 83 and energizing the air motor 22. The air supply is shut off by moving the valve 80 to the off position, connecting the air cylinder 75 to exhaust so that the probe is moved upward out of engagement with the air track shutting off the supply of air to the air bearings, which then deflate.

Figure 4:
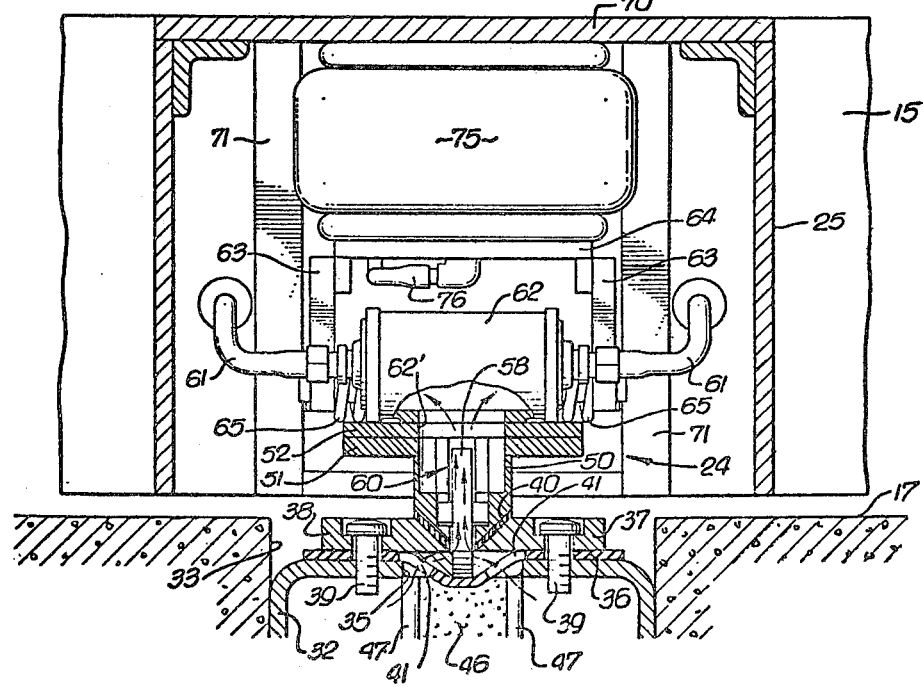
FIG. 4 is a view similar to that of FIG. 3 showing the probe in the lowered position.

The probe is shown in the downward or track engaging position in FIGS. 4 and 6. When the air cylinder 75 is charged, it expands and moves the shoe downward into engagement with the side walls of the slot 40, with the wheel 58 forcing the membrane downward out of sealing engagement with the slot against the upward urging of the air within the conduit. Air now flows from the conduit through the openings of the membrane into the slot of the shoe through the tube 60 and the lines 61. The inner edges of the clamp members 37, 38 preferably have a V-shaped configuration as seen in FIG. 3, and the shoe preferably has a corresponding V-shaped configuration. It is desirable to have the shoe in sealing engagement with the clamp members to reduce air loss.

As the vehicle moves along the track, the wheel 58 rolls along the membrane 36 and the shoe 50 slides along the clamp members 37, 38 at the walls of the slot 40. There is little wear on the membrane resulting from the rolling contact of the wheel. The shoe preferably has resilient surfaces engaging the walls of the slot for maximum sealing and minimum wear. A preferred construction comprises a layer 90 of a resilient material such as foam rubber cemented to the shoe, with an outer skin on the resilient material of a tough smooth material, such as 0.005 or 0.010 inch thick teflon. The sliding engagement of the resiliently backed skin of the shoe against the walls of the slot produces very little wear while providing a good pneumatic seal. When wear or damage does occur, the facing on the shoe is readily removed and replaced.

The shoe is relatively long, as best seen in FIG. 6, so that the front and rear portions of the shoe projecting beyond the slot 60 engage the membrane where the membrane has not been moved downward by the wheel. A sealing engagement could be obtained here, but it is preferred to have a slight amount of air leakage directed generally horizontally along the top of the membrane for the purpose of cleaning the membrane and slot walls prior to engagement by the shoe and wheel.

The air supply system of the present invention has a number of advantages. The entire probe assembly may be carried on the top plate 70 which is readily lifted out of the housing 25 for inspection and replacement of the sliding surfaces of the shoe and the flexible air lines. There is no limitation on the length of the track, and a continuous air supply can be provided to any number of vehicles moving along one track at the same time. The probe can be engaged with and disengaged from the air track at any point along the track at any time. The vehicle is self-sufficient and does not require any onboard power supply or any hose lines or electrical lines connecting it to fixed sources. The probe and track are self-cleaning and may be constructed from materials having a long life and high chemical and heat resistance.

Figure 7:
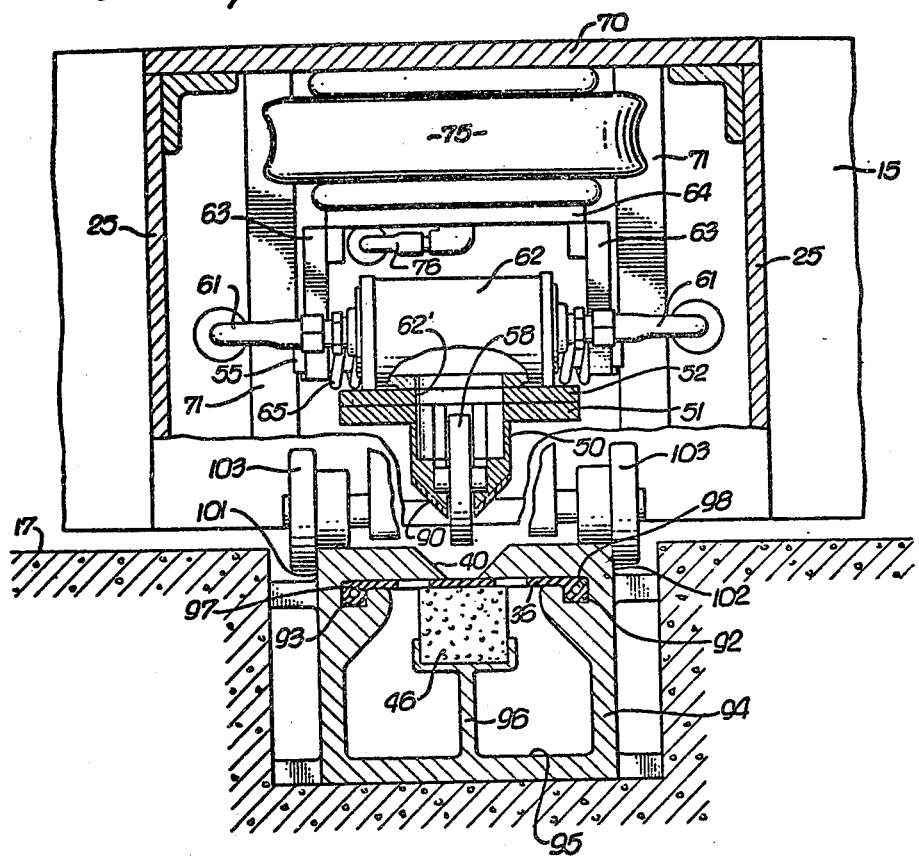
FIG. 7 is a view similar to that of FIG. 3 showing an alternative embodiment of the invention.

An alternative form for the air track is shown in FIG. 7, where elements corresponding to those of FIGS. 2-6 are identified by the same reference numerals. The membrane 36 has beads 92, 93 along the opposite edges. The conduit may be an extrusion 94 providing an internal chamber 95 for the air, a support bracket 96 for the block 46, grooves 97, 98 for slidingly receiving the membrane 36, and V-shaped side walls for the slot 40. Exterior shoulders 101, 102 may be utilized to provide guide tracks for guide wheels 103 of the vehicle. The operation of the embodiment of FIG. 7 is the same as that of the earlier described embodiment.

While the air supply system has been described herein as used in a floor for supplying air to air bearings of a transporter, the invention is not limited to this particular end use and can be utilized to provide air to any vehicle moving along the track, and with the track in any orientation, that is, the slot may face upward or downward or laterally as desired.

Figure 9:
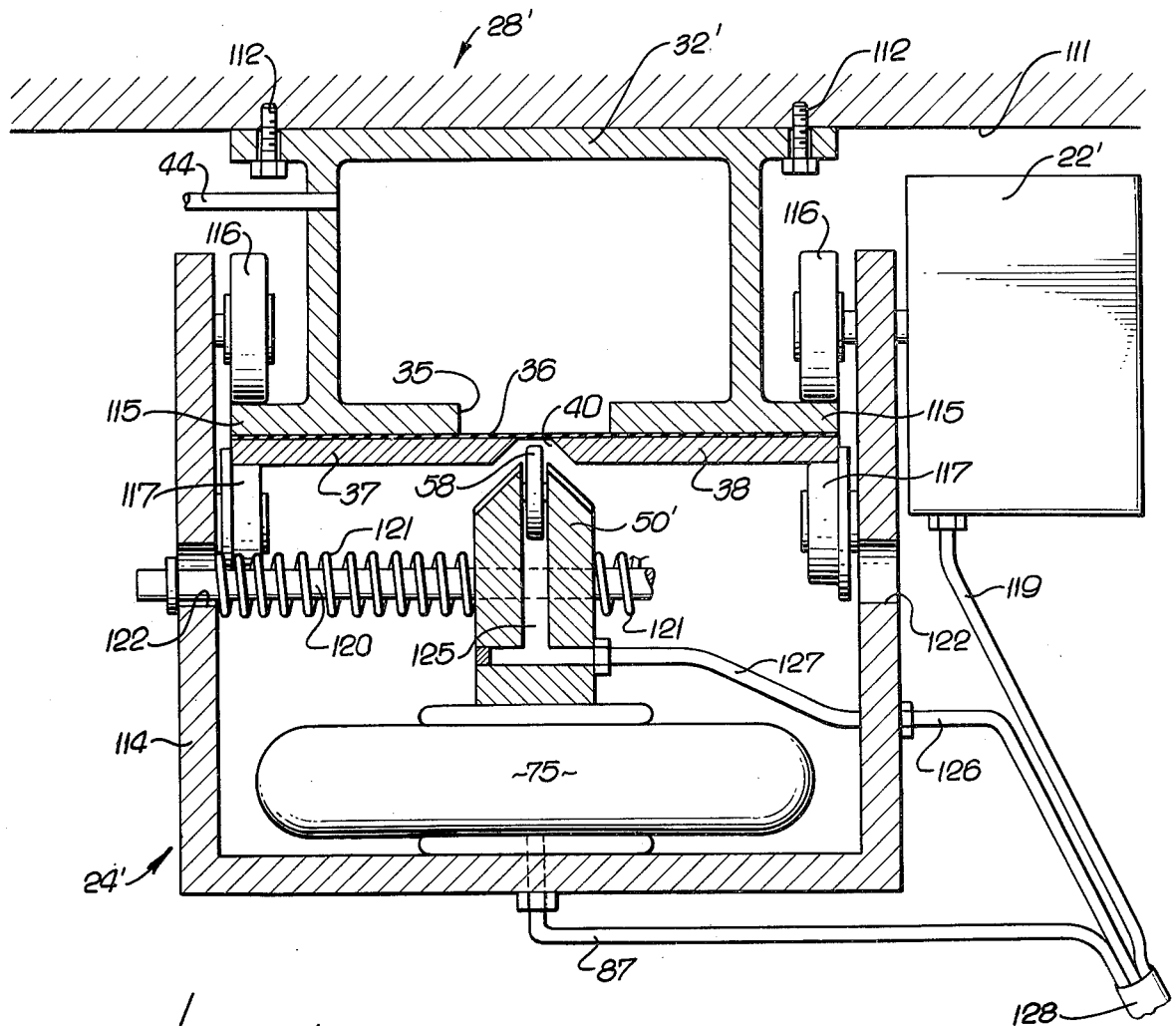
FIG. 9 is a view similar to that of FIG. 3, with the track and probe over head.
Figure 10:
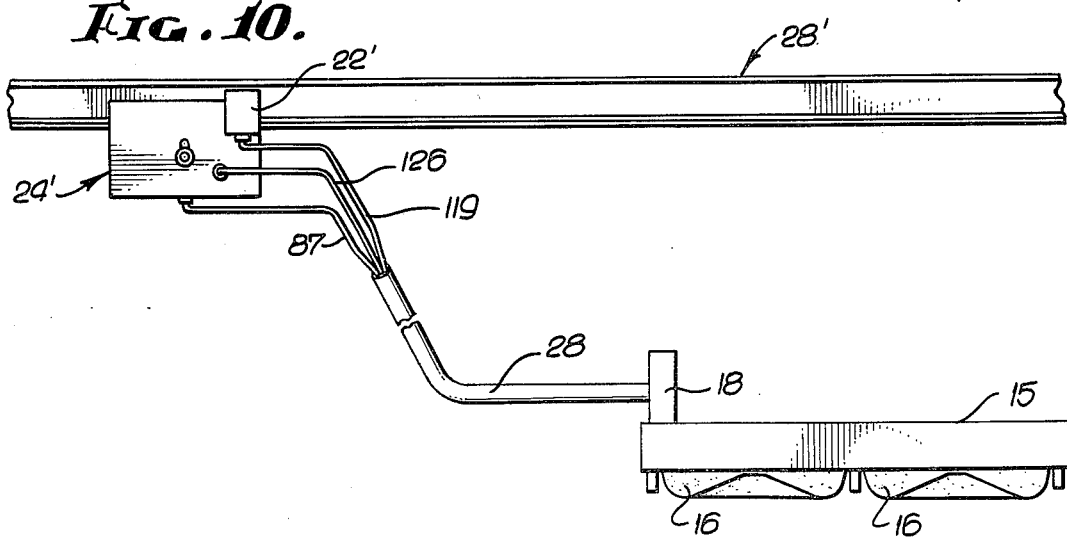
FIG. 10 is a diagrammatic illustration of the embodiment of FIG. 9 coupled with a transporter.

One alternative embodiment with the track mounted over head is shown in FIGS. 9 and 10. The track and probe are similar to those illustrated in FIGS. 2-6 and corresponding elements are identified by the same reference numerals.

The track 28' includes a conduit 32' which may be an extrusion or fabricated from rolled pieces, as desired. The conduit is mounted over head, as by being attached to a ceiling 111 with fasteners 112. Air is supplied to the interior of the conduit via the air inlet 44. The membrane 36 is mounted at the opening or slot 35 by the clamp plates 37, 38, with the converging faces of the clamp plates defining the slot 40.

The probe 24' includes a frame 114 which is suspended from flanges 115 of the conduit 32' on wheels 116. Guide wheels 117 carried on the frame 114 engage the clamp plates 37, 38 for guiding the frame as it rolls along the conduit. One of the wheels 116 may be driven by a motor 22' carried on the frame 114. Preferably the motor is an air operated motor receiving air under pressure through line 119.

In the embodiment illustrated, the shoe 50' is moved into engagement with the membrane 36 by the air cylinder 75, with gravity moving the shoe downward away from the membrane when the air cylinder is exhausted. The shoe 50' may move laterally on two shafts, one of which is shown at 120, with springs 121 providing for centering of the shoe on the shafts. The shafts may move vertically in slots 122 in the frame as the shoe is moved into and out of engagement with the diaphragm.

An air passage 125 in the shoe is connected to an air line 126 by another line 127. The three lines 87, 119 and 126 preferably are joined in a cable 128 for connection to a remote load, as shown in FIG. 10. Typically the load is a transporter 15 such as is shown in FIG. 1, with air bearings 16 and a control box 18. However, the air supply system is not limited to supplying air to the air bearings of a transporter and can be used to provide air to other types of loads as desired.

The embodiment of FIGS. 9 and 10 operates in the same manner as the embodiment of FIGS. 2-6 and the air control circuit of FIG. 8 is suitable for use with the embodiment of FIGS. 9 and 10. If the load does not utilize an air motor, the valve 83 of the circuit of FIG. 8 can be used to control the probe drive motor 22'. Alternatively, a branch line can be provided between the probe and the valve 83 to feed air to the motor 22' through another valve.

We claim:
1. In an air supply system, the combination of:
a track comprising an air conduit with a first wider slot therealong,
a membrane overlying said first slot, and
clamp means clamping said membrane onto said conduit and defining a second narrower slot, with air pressure in said conduit urging said membrane against said second slot in sealing relation,
said membrane having a plurality of openings therealong communicating with the interior of said conduit through said first slot, with said openings closed by said clamp means when said membrane is against said second slot, said clamp means including spaced guide surfaces defining a groove converging toward said membrane; and
a probe for positioning at said track and comprising a shoe for engagement with said clamp means adjacent said second slot,
a membrane contact member carried in said shoe,
means defining an air flow passage from said contact member through said shoe to a load, and
means for moving said shoe towards said track engaging said contact member with said membrane, said contact member moving said membrane away from said second slot for air flow from said conduit through said first slot, membrane openings and second slot into said shoe, and for moving said shoe away from said track disengaging said contact member from said membrane and blocking air flow, said shoe having converging side walls of uniform cross-section extending along said track in both directions from said contact member in sliding sealing engagement with said guide surfaces providing a matched interface between said track and probe, so that said clamp means guides said shoe both in movement along said track and toward said track and provides an air seal with said shoe, with said shoe air flow passage centrally located in said shoe and with said shoe closed between said converging side walls in front and back of said flow passage and positioned at said membrane.

2. An air supply system as defined in claim 1 wherein said membrane contact member is a wheel having rolling engagement with said membrane.

3. An air supply system as defined in claim 1 with air leakage paths between said shoe and membrane along said membrane when said probe engages said track for air flow along the track.

4. An air supply system as defined in claim 1 wherein said shoe side walls are of a resilient material with an outer skin of a smooth non-resilient material.

5. An air supply system as defined in claim 1 including a vehicle and means for mounting said probe on said vehicle.

6. An air supply system as defined in claim 1 including a frame with said probe mounted therein, with said track and said frame having interengaging means for supporting said frame on said track.

7. An air supply system as defined in claim 6 wherein said interengaging means includes a flange on said track and a wheel on said frame, and
a drive motor carried on said frame and coupled to said wheel for driving said probe along said track.

8. An air supply system as defined in claim 1 including an elongate resilient membrane support member within said conduit urging said membrane against said slot.

9. An air supply system as defined in claim 1 including an elongate air permeable resilient membrane support member within said conduit urging said membrane against said slot.

10. An air supply system as defined in claim 1 wherein said means for moving said shoe towards said track includes an air cylinder and said means for moving said shoe away from said track includes a spring which is compressed when said shoe is moved towards said track.

11. In an air supply system, the combination of:
a track comprising an air conduit with a first wider slot therealong,
a membrane overlying said first slot, and
clamp means clamping said membrane onto said conduit and defining a second narrower slot, with air pressure in said conduit urging said membrane against said second slot in sealing relation,
said membrane having a plurality of openings therealong communicating with the interior of said conduit with said openings closed by said clamp means when said membrane is against said second slot; and
a probe for positioning at said track and comprising
a shoe for engagement with said clamp means adjacent said second slot,
a membrane contact member carried in said shoe,
means defining an air flow passage from said contact member through said shoe to a load, and
means for moving said shoe towards said track engaging said contact member with said membrane, said contact member moving said membrane away from said second slot for air flow from said conduit through said first slot, membrane openings and second slot into said shoe, and for moving said shoe away from said track disengaging said contact member from said membrane and blocking air flow;
with said shoe carried in a slider bracket on pins providing side to side movement of said shoe relative to said bracket.

12. An air supply system as defined in claim 11 wherein said slider bracket is carried in a frame on pins providing in and out movement of said shoe relative to said frame.

13. In an air supply system, the combination of:
a track comprising an air conduit with a slot therealong, and
a membrane carried in said conduit at said slot with air pressure in said conduit urging said membrane against said slot in sealing relation,
said membrane having a plurality of openings therealong with said openings closed by said conduit when said membrane is against said slot;
a probe for positioning at said track and comprising
a shoe for engagement with said conduit adjacent said slot,
a membrane contact member carried in said shoe,
means defining an air flow passage from said contact member through said shoe to a vehicle, and
means for moving said shoe towards said track engaging said contact member with said membrane, said contact member moving said membrane away from said slot for air flow from said conduit through said membrane openings and slot into said shoe, and for moving said shoe away from said track disengaging said contact member from said membrane and blocking air flow;
a vehicle with a plurality of air bearings and an air control circuit for controlling air flow to said air bearings; and
means for connecting said probe to said vehicle with said air flow passage connected to said air control circuit;
said probe including an air cylinder for moving said shoe towards said track, and said air control circuit including:
a source of air under pressure;
a first control valve movable between an on position connecting said air cylinder to said source, and an off position connecting said air cylinder to exhaust;
means connecting said probe to said air bearings and to said source;
a check valve in line between said probe and said source for blocking air flow from said source to said probe; and
a second control valve movable between a first position connecting said probe to said first valve, and a second position connecting said source to said first valve.

14. An air supply system as defined in claim 13 including an air powered drive unit mounted in said vehicle, and a third control valve for connecting said probe to said drive unit.

15. An air supply system as defined in claim 13 including means mounting said probe on said vehicle.

16. An air supply system as defined in claim 13 including means mounting said probe on said track.

* * * * *